United States Patent [19]

Abrams

[11] 4,435,145
[45] Mar. 6, 1984

[54] ROLLING PIN WITH GAUGE WHEELS

[76] Inventor: Gerald Abrams, P.O. Box 351, Pinetops, N.C. 27864

[21] Appl. No.: 351,566

[22] Filed: Feb. 23, 1982

[51] Int. Cl.³ .......................... A21C 1/08; A21C 3/02
[52] U.S. Cl. .................................. 425/458; 29/111; 30/307; 425/374
[58] Field of Search ................. 425/87, 374, 458, 363; 29/110.5, 111; 30/307

[56] References Cited

U.S. PATENT DOCUMENTS

| 39,916 | 9/1863 | Heissenbuttel | 425/374 |
| 353,177 | 11/1886 | Taylor | 29/110.5 |
| 359,480 | 3/1887 | Weber | 30/307 |
| 534,460 | 2/1895 | Wolf et al. | 29/110.5 |
| 550,337 | 11/1895 | Wolf et al. | 29/110.5 |
| 1,534,907 | 4/1925 | Broeker | 30/307 |
| 2,920,389 | 1/1960 | Nurmi | 30/307 |
| 3,994,652 | 5/1975 | Kuzyk | 425/298 |

Primary Examiner—Willard E. Hoag
Attorney, Agent, or Firm—Dowell & Dowell

[57] ABSTRACT

An apparatus for rolling plastic material such as bread dough or cookie dough so that the material has a substantially constant thickness throughout the entire mass. The apparatus includes an elongated cylindrical body having an outwardly extending axial handle at each end and each of such handles has a selected gauge wheel removably mounted at the outer end thereof.

2 Claims, 4 Drawing Figures

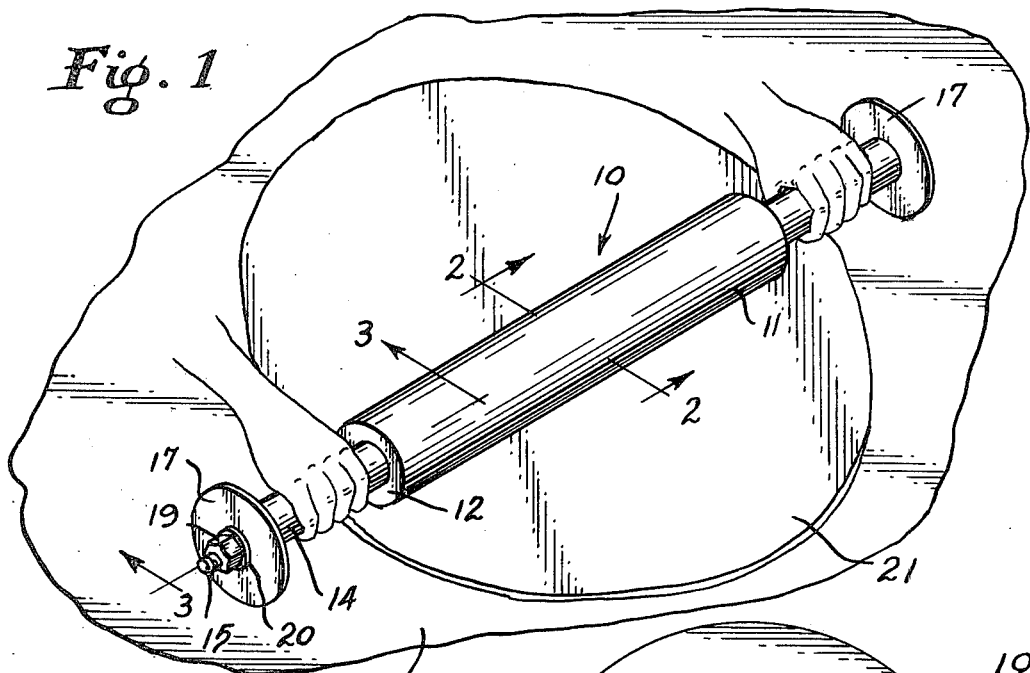
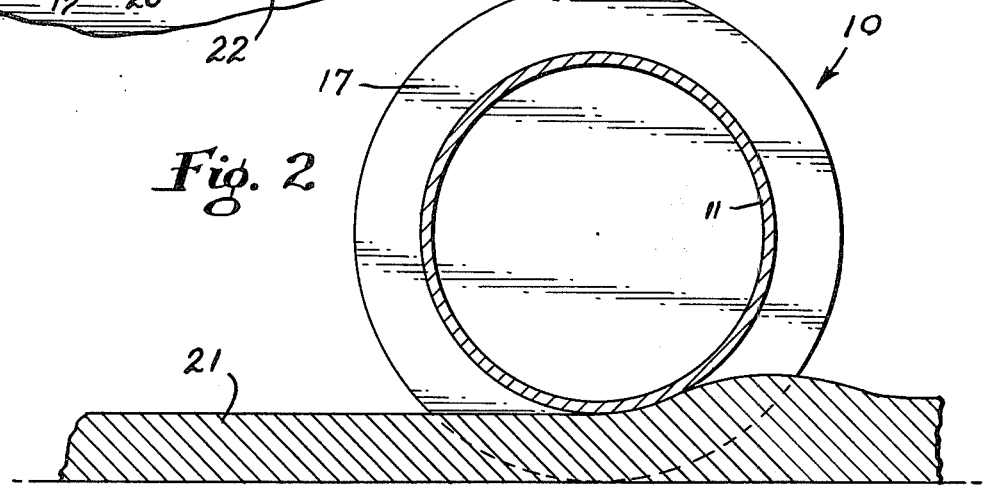
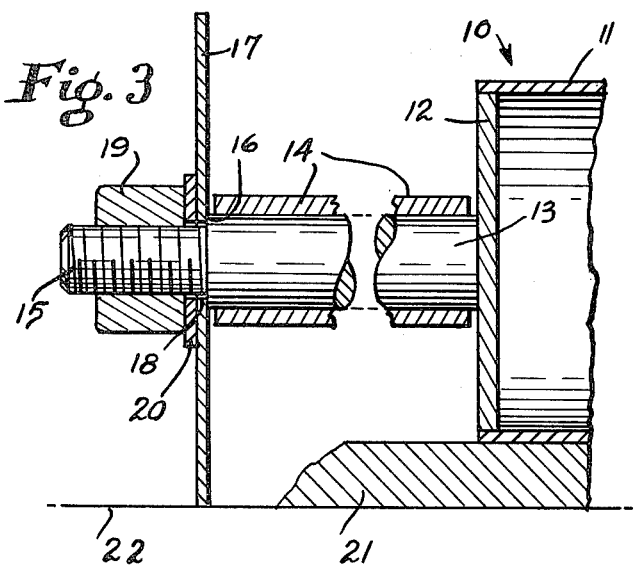

ROLLING PIN WITH GAUGE WHEELS

TECHNICAL FIELD

This invention relates generally to apparatus used in the preparation of food and relates particularly to apparatus used for rolling a batch of dough or the like to a predetermined thickness so that the edible products which are made from the dough are substantially uniform from batch to batch.

BACKGROUND ART

For generations cooks and bakers have mixed flour with a liquid such as milk, water, or the like and other ingredients to form a plastic mass or dough in the preparation of bread, pastries, doughnuts and the like. After the dough has been prepared, a rolling pin having a cylindrical body with a handle at each end has been used to roll out the batch of dough until the dough is approximately at a desired thickness. Ordinarily the batch of dough is rolled into a generally circular mass having a diameter which is greater than the length of the cylindrical body of the rolling pin and this has been accomplished by placing the rolling pin at the center of the batch and moving it radially outwardly while applying a downward pressure on the handles at opposite ends to spread the dough to a desired thickness.

With this type of rolling pin, it has been difficult to obtain a constant thickness, particularly from batch to batch of the dough because the rolled out batch of dough covers the base material on which it is being rolled so that the thickness may be judged only at the periphery of the mass. Also, if more pressure is applied to one handle than the other, or if more pressure is applied at the center of the mass than at the periphery, the thickness of the mass of dough will be non-uniform.

Some efforts have been made to alleviate the problems of thickness and non-uniformity by placing gauge wheels on a rolling pin at the ends of the central body and between such body and the handles. This has not been satisfactory because the batch of dough ordinarily is spread out to a diameter which is larger than the length of the cylindrical body and one or both of the gauge wheels penetrate or cut the dough being rolled.

It has been suggested that the cylindrical body be lengthened so that the gauge wheels will remain clear of the rolled out batch of dough. This has not proved satisfactory because the handles were then so far apart that the cook or baker had difficulty in applying sufficient pressure on the batch of dough to roll the dough to the desired thickness.

Further, when the gauge wheels have been mounted between the cylindrical body and the handles, if a greater pressure has been applied to one of the handles, the gauge wheel at that side has tended to function as a fulcrum and pivot the other end upwardly. Even if the difference in pressure is not sufficient to pivot the other end upwardly, the resilient consistency of the batch of dough is sufficient to cause the other end of the rolling pin to ride up on the dough and cause non-uniformity in the thickness of the dough.

Some examples of this type of rolling pin are disclosed in United States patents to Heissenbuttel Nos. 39,916; Taylor 353,177; Wolff et al 534,460 and 550,337; Broecker 1,534,907; and Kuzyk 3,994,652.

DISCLOSURE OF THE INVENTION

The present invention is directed to a rolling pin having gauge wheels which are selectively removably mounted along the axis of the rolling pin externally of the handles. A number of sets of gauge wheels are supplied and each set has a diameter which is difficult from the other sets. A selected set of gauge wheels is removably mounted at the outer ends of the handles so that the central cylindrical body is spaced a predetermined distance above the work surface.

It is an object of the invention to provide a rolling pin having a central cylindrical body with a handle extending axially outwardly from each end and having a gauge wheel removably mounted at the outer end of each handle in such a manner that the gauge wheels space the cylindrical body a predetermined distance above a work surface.

Another object of the invention is to provide a plurality of sets of gauge wheels for use with a rolling pin having an elongated cylindrical body and means for removably mounting a selected set of gauge wheels on the rolling pin in axially spaced relationship with such body in such a manner that the gauge wheels will not interfere with the material being worked or rolled.

It is yet another object of the present invention to provide a rolling pin having an elongated cylindrical body with handles extending outwardly from each end thereof and which includes gauge wheels disposed adjacent the outermost portions of the handles so that rolling pressure applied by the user is applied between the gauge wheels. In this manner, the cylindrical body is prevented from pivoting or rocking about either gauge wheel and a more uniformly rolled product may be obtained.

BRIEF DESCRIPTION OF THE DRAWING

FIG. 1 is a perspective view illustrating one application of the invention.

FIG. 2 is an enlarged sectional view taken on the line 2—2 of FIG. 1.

FIG. 3 is an enlarged fragmentary sectional view taken on the line 3—3 of FIG. 1.

FIG. 4 is an enlarged fragmentary side elevational view of one end of a rolling pin having a different size gauge wheel mounted thereon.

DESCRIPTION OF THE PREFERRED EMBODIMENT

With reference to the drawing, a rolling pin 10 is provided having an elongated generally cylindrical body 11 with an end wall 12 at each end. A pin or rod 13 is welded or otherwise fixed to each wall 12 and extends axially outwardly therefrom. A handle forming sleeve 14 is provided at each end of the rolling pin and each of such sleeves has an inner diameter of a size to freely rotatably receive one of the rods 13.

The outer free end of each of the rods 13 is provided with a reduced portion 15 which is separated from the remainder of the rod by a shoulder 16. A gauge wheel 17 having an axial opening 18 of a size to slidably receive the reduced portion 15 is mounted on such reduced portion in engagement with the shoulder 16. Preferably, the reduced portion 15 is threaded to receive a threaded fastener such as a nut 19 and a washer 20 to retain the gauge wheel on the reduced portion 15. However, it is contemplated that other conventional means could be used to retain the gauge wheels on the rods 13. For example, the reduced portion 13 could be smooth and a lock pin extending through a transverse opening in the reduced portion could hold the gauge wheels in position. Also, a pair of spaced removable collars could be provided on the rod 13 in which case, the reduced portions could be omitted.

In order to roll a batch or mass of dough 21 located on a work surface 22 to a desired uniform thickness, a plurality of sets of gauge wheels are provided for selective use with the rolling pin 10. Each set of gauge wheels consists of two substantially identical wheels with each set of wheels being larger in diameter than the diameter of the central body 11 so that the entire length of the body is spaced a predetermined distance above the work surface when the gauge wheels are mounted in working position. Such predetermined distance will vary depending upon the desired thickness of the mass of dough 21 and the corresponding set of gauge wheels that are mounted on the reduced portions 15 at opposite ends of the rolling pin. For example, when the rolling pin is to be used for rolling a pie crust which has a thickness of approximately 0.125 inch (0.317 cm), the gauge wheels will have a diameter which is 0.25 inch (0.634 cm) larger than the diameter of the body 11. When the rolling pin is to be used for rolling dough for biscuits or the like which have a thickness of 0.5 inch (1.27 cm), the gauge wheels will have a diameter which is one inch (2.54 cm) larger than the diameter of the body.

Although the rolling pin may be of any desired size, a rolling pin having a body which is approximately 18 inches (45.72 cm) in length and 3.5 inches (8.89 cm) in diameter has been found satisfactory. With a body of this size, a pin or rod 13 having a length of six inches (15.24 cm) from the end wall to the reduced portion and a diameter of 0.75 inch (1.905 cm) has been fixed to each end of the body and a handle forming sleeve having a length of 5.87 inch (14.91 cm) and an outer diameter of one inch (2.54 cm) has been freely rotatably mounted on each pin.

In order to meet health department requirements, the rolling pin 10 preferably is constructed of stainless steel or other bacteria resistant material which may be easily disassembled and sterilized. Normally, the cylindrical body 11 is hollow to reduce weight and cost, however, if additional weight is desired, one of the end walls 12 may be provided with a removable plug (not shown) so that water or other relatively heavy material may be added to the interior of the body. Also, it is contemplated that the sleeves 14 may be constructed of a thermoplastic polyamide such as nylon or the like to reduce friction between the sleeve and the pins or rods 13 when a downward pressure is being applied to the rolling pin.

In the operation of the device, a mass or batch of dough 21 is prepared and placed on the work surface 22. A sleeve 14 is placed on the rod 13 at each end of the body 11 after which a selected set of gauge wheels are placed on the reduced portions of the rods and secured thereto by nuts 19. When the rolling pin is assembled, the body 11 is placed longitudinally across the center of the mass of dough and a downward pressure is applied substantially equally to the handle forming sleeves while the rolling pin is moved radially outwardly of the mass. Normally, it requires several passes of the rolling pin to roll the mass of dough outwardly to the desired thickness and ordinarily the gauge wheels 17 do not engage the work surface 22 until the dough is at the desired thickness.

However, the gauge wheels insure that the thickness of the dough is not less than the desired thickness and that the thickness is substantially uniform over the entire mass of the dough. Since the gauge wheels are located outwardly of the handle forming sleeves 14, the downward pressure being applied by the operator cannot tip the rolling pin to cause a non-uniform thickness and such wheels are spaced from the body 11 a distance sufficient to avoid cutting the dough even though the mass of dough has a diameter which is greater than the length of such body.

If dough of a different thickness is desired, the nuts 19 are removed and the gauge wheels are slipped off of the reduced portion 15 after which a second set of gauge wheels are positioned on the portions 15 and the nuts are replaced so that the operation may be continued or repeated.

I claim:

1. A rolling pin for rolling a mass of resilient material to a constant uniform thickness comprising an elongated cylindrical body having a predetermined diameter and having opposite ends, rod means extending axially outwardly from each end of said body, each of said rod means having an outer end, gauge wheel means mounted adjacent said outer end of each of said rod means, said gauge wheel means both having the same diameters and being of a diameter which is greater than the predetermined diameter of said body, handle means carried by each of said rod means, said handle means being disposed between said gauge wheel means and said ends of said cylindrical body, and locking means for obstructing the removal of each of said gauge wheel means for said rod means, said gauge wheel means having a central opening therethrough of a size to slidably receive said outer ends of said rod means, stop means on each of said rod means between said outer ends thereof and said handle means for obstructing the movement of said gauge wheel means along said rod means toward said cylindrical body whereby said handle means are spaced inwardly of said gauge wheel means so that downward pressure applied to either of said handle means will be directed to said gauge wheel means and said cylindrical body even if no downward pressure is being applied to the other of said handle means.

2. The apparatus of claim 1 in which said handle means are rotatably carried by said rod means and have a central opening therethrough, said central opening being of a size to permit said handle means to be slidable along said rod means and over said stop means so that said handle means can be removed from said rod means when said gauge wheel means are detached.

* * * * *